Patented Apr. 30, 1940

2,198,622

UNITED STATES PATENT OFFICE 2,198,622

PROCESS OF HEATING PLATES OF GLASS FOR TEMPERING

Lewis Jex-Blake Forbes, St. Helens, England, assignor to The American Securit Company, Wilmington, Del., a company of Delaware No Drawing. Application May 26, 1936, Serial No. 81,908. In Great Britain May 31, 1935

2 Claims. (Cl. 49—89)

This invention relates to the tempering of plates of glass and has for its object an improved method and apparatus for heating the plates under manufacturing conditions.

In tempering glass plates, each plate has to remain in the furnace, whether a single or multi-stage furnace, for a period of about six minutes, while the cooling process requires only about one minute. It is therefore necessary for economical manufacture to coordinate the number of furnaces with the times of operation that a regular cycle of operations is continuously carried out, which utilises the operatives' time to the full.

The times during which the plates are in the furnaces are then fixed by this cycle of operations, and the only means whereby the temperature of the plates can be adjusted to the correct temperature for tempering, is variation of the heat supply to the furnaces.

Now when a succession of plates of the same size are passed through a furnace, the heat supply to the furnace must be adjusted so as to be equal to the heat put into the plates, plus the loss of heat by radiation and conduction of the furnace. If therefore, a smaller plate be passed through the furnace, the excess heat then available will go to raise the temperatures of the plate and of the furnace. Therefore, in order to keep the final temperature of the plate within the narrow limits suitable for tempering, it has hitherto been found necessary to adjust the heat supply to the furnace on the introduction of the plate, the size of the plate being estimated by the operative and an appropriate adjustment of the heat supply made. When two or more small plates are introduced, it is difficult to estimate their total area, and it has been found that irregularities in tempering result from improper pre-adjustment of the heat supply to the furnace.

According to the invention, the plates are heated in a multi-stage furnace and the temperatures of the furnaces in the multi-stage furnace are so regulated that the last furnace raises the temperature of the plates by an amount substantially less than the average rise of temperature in the preceding furnaces, or, in the case of only two furnaces, then the rise of temperature in the preceding furnace. Preferably the rise of temperature in the last furnace is less than one-third the said average rise or the said rise, and may be fifty degrees centigrade or less.

The cooling effect of a plate of glass in a furnace depends on the heat capacity of the furnace, but this cannot in practice be made very large.

To take, by way of example, the case of a particular furnace used for tempering glass, the heat capacity is about fifteen times that of the plate of glass filling the furnace. The heat capacity is measured as the extra amount of heat that has to be supplied to a furnace in normal steady work to raise its temperature a given amount. If the heat supply to the furnace has been adjusted to heat a full sized plate from 20° to 680°, and a plate twenty-five per cent less in weight is introduced into it, the plate will be heated to approximately 690.5 degrees, that is to say 10.5 degrees above the correct temperature. Since such a temperature would lead to deformation of the plate, the rate of heat supply to the furnace would have to be diminished when the plate was introduced, and it would have to be increased again if the following plate were a full sized plate.

If two furnaces were used and regulated so that each raised the temperature of the glass by approximately the same amount, each doing approximately the same amount of work, then the final temperature of the glass would be about 5.8 degrees too high, which also is an excessive amount.

As the number of furnaces is increased, the variation in the final temperature of the glass diminishes. Thus, with four furnaces, all doing the same work, the final temperature would be about 2.6 degrees too high. This difference is approaching the permissible tolerance, but, if a second small plate were introduced, the rise of temperature of this plate would be approximately twice as great, by reason of the fact that the temperatures of the furnaces would have risen.

In calculating the above variations of temperature, it has been assumed that there is the same final difference of temperature between furnace and glass for the two sizes of glass. This is very nearly the case.

Suppose now that two furnaces are used, and regulated so as to maintain constant average temperatures for the full sized plates, the first furnace heating the plate to 500 degrees and the second from 500 to 680 degrees, the second furnace thus doing about three-eighths of the work of the first. Thus the above-mentioned small plate would reach a temperature of 507.6 degrees in the first furnace and a temperature of 682.7 degrees in the second.

This excess temperature is less than half that in the case when the two furnaces were regulated normally, so as to do the same amount of work, and is approximately the same as in the case of four furnaces.

If the two furnaces were regulated for full size plates to give temperatures of 600 and 680 degrees respectively, then the excess temperature would be only 1.1 degrees.

If they were regulated for temperatures of 660 and 680 respectively, then the excess temperature would be only 0.3 degree. With so small a variation, the heat supply to the furnaces could be kept constant for long periods while plates of varying size were introduced.

Similarly, if four furnaces were so regulated that the same rise of temperature of 20 degrees were given by the last furnace, while the rise up to 660 degrees was divided equally among the three preceding furnaces, the excess temperature would again be only 0.3 degree.

Thus, by means of the invention, as good a regulation can be obtained by the use of two furnaces as by the use of four, although four furnaces have an advantage in regard to economy of time.

The rise of temperature to be given by the last furnace to secure the advantage of the invention must depend on the diversity in the size of the plates to be tempered during, say, a day. In the foregoing, it has been assumed that variations in the size of plate do not exceed 25%. This is generally the case in practice, because when small plates are being tempered, the area of plates which the furnace will take is made up by two or more plates. If, though, larger variations are likely to occur, it is preferable that the rise of temperature in the last furnace should be 20 degrees or less.

Having described my invention, I declare that what I claim and desire to secure by Letters Patent is:

1. Process of heating plates of glass for tempering in a multi-stage furnace, characterised by regulating the furnaces so that the rise of temperature of the plates in the last furnace is less than one-third the average rise of temperature in the preceding furnaces.

2. Process of heating plates of glass for tempering in a multi-stage furnace, characterised by regulating the furnaces so that the last furnace raises the temperature of the plates by an amount substantially less than the average rise of temperature in the preceding furnaces, and not exceeding fifty degrees centigrade.

LEWIS JEX-BLAKE FORBES.